May 8, 1934.  L. D. EASON  1,958,389
EMERGENCY BRAKE RELEASE AND CUT-OUT VALVE
Original Filed May 29, 1931  2 Sheets-Sheet 1
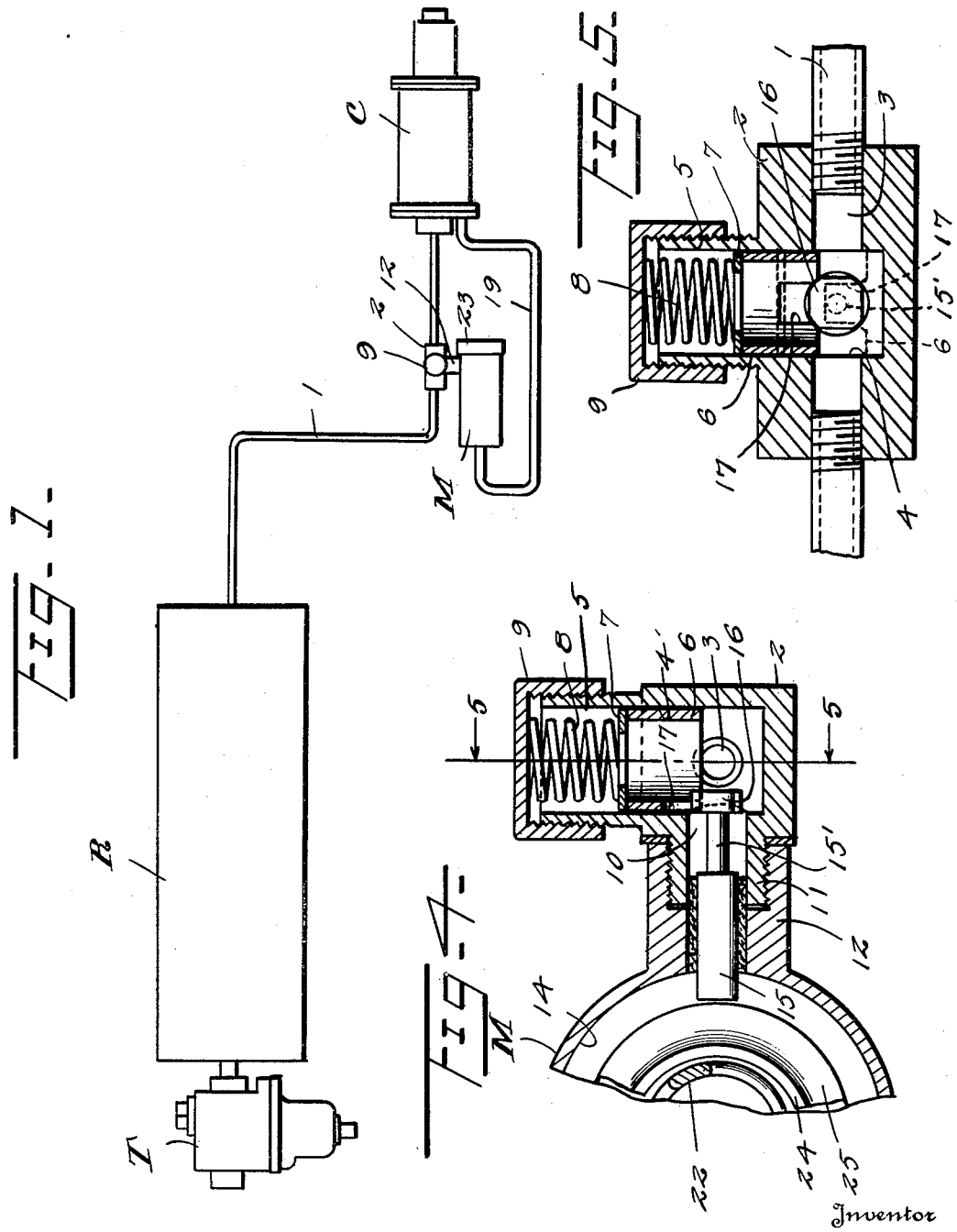
Inventor
L. D. Eason
By Watson E. Coleman
Attorney

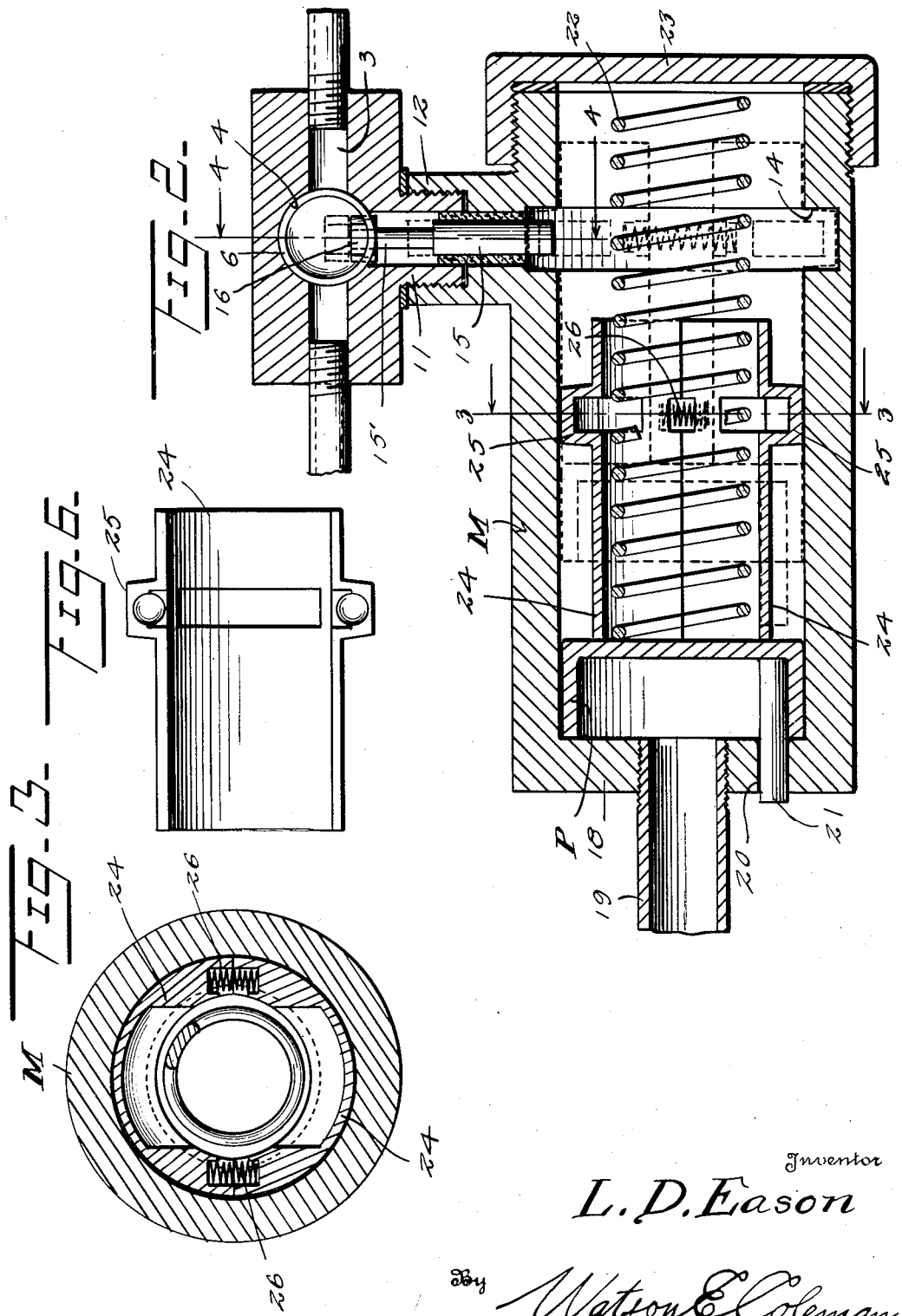

Patented May 8, 1934

1,958,389

UNITED STATES PATENT OFFICE 1,958,389

EMERGENCY BRAKE RELEASE AND CUT-OUT VALVE

Levi D. Eason, Rocky Mount, N. C., assignor of one-half to B. William Arnold, 3d Application May 29, 1931, Serial No. 541,038
Renewed September 11, 1933

2 Claims. (Cl. 303—84)

This invention relates to air brake equipment, and it is primarily an object of the invention to provide means cutting off the delivery of air to the brake cylinder upon abnormal pressure building up within the cylinder and particularly when such abnormal pressure results from a bad order triple.

Another object of the invention is to provide in a brake equipment means to release automatically abnormal pressure building up within the brake cylinder.

The invention consists in the details of construction and in the combination and arrangement of the several parts of my improved air brake equipment whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a diagrammatic view illustrating brake equipment embodying my invention;

Figure 2 is an enlarged fragmentary sectional view with parts in elevation illustrating the means as herein embodied for cutting off the flow of air from the reservoir to the brake cylinder, a second position of certain of the parts being indicated by broken lines;

Figure 3 is a detailed sectional view taken substantially on the line 3—3 of Figure 2;

Figure 4 is a fragmentary detailed sectional view taken substantially on the line 4—4 of Figure 2 with certain of the parts in elevation;

Figure 5 is a fragmentary detailed sectional view taken substantially on the line 5—5 of Figure 4 with certain of the parts in elevation;

Figure 6 is a plan view of one of the operating and locking members as herein disclosed unapplied.

As disclosed in the accompanying drawings, R denotes an air reservoir with which is associated in a well known manner any desired type of triple valve T. The brake cylinder C has in communication therewith the air pressure line 1. As the foregoing features or parts are all well known and in themselves form no particular part of my invention, it is not believed that a detailed description and illustration thereof is required.

Interposed in the line 1 is a casing 2 of desired dimensions and configuration, the bore 3 of which being in continuity with the line 1 and forming a part thereof. The bore 3 of the casing 2 intersects the transversely disposed valve chamber 4 the axis of which being at right angles to the axis of the bore 3. The valve chamber 4 has its inner or closed end to one side of the bore 3 while the opposite portion of the chamber 4 is continued through an outstanding sleeve or nipple 5 integral with the casing 2. This valve chamber 4 is circular in cross section as herein set forth and snugly engaged therein is a sleeve valve 6, the upper or outer end of which having engaged therewith a washer 7 forming an abutment for an end portion of an expansible member 8, the opposite end portion of which being in contact with an applied cap 9 closing the outer end of the sleeve or nipple 5. This expansible member 8, as herein disclosed, is a coil spring and, of course, the tension of the member or spring 8 may be regulated or adjusted depending upon the extent of application of the cap 9 upon the sleeve or nipple 5.

The member or spring 8 serves to constantly urge the sleeve valve 6 toward the inner end of the valve chamber 4 so that said valve sleeve 6 will effectively intersect the bore 3 of the casing 2 and thereby shut off the flow of air through the pipe line 1 to the brake cylinder C.

At a point preferably in alignment with the bore 3, the casing 2 is provided with an opening 10 extending through a surrounding sleeve 11 disposed substantially at right angles to the sleeve or nipple 5.

The sleeve 11 couples to an outstanding sleeve 12 carried by an end portion of a cylindrical member M of desired dimensions, the bore of said sleeve 12 being directly in communication with an annular groove or channel 14 formed in the inner wall of the member M. Placed within the bores of the sleeves 11 and 12 for free endwise movement is an elongated bolt or locking member 15 the portion 15' thereof within the bore of the sleeve 11 being for a considerable distance reduced in diameter whereby is provided an elongated neck, the outer end of which carrying an enlargement or head 15. The length of the bolt or member 15 from end to end is slightly in excess of the combined lengths of the bores of the sleeves 11 and 12 plus the depth of the annular groove or channel 14 so that when the bolt or member 15 is properly set in working position the head 16 thereof will be positioned within the valve chamber 4 below the sleeve valve 6 which has been raised into open position as illustrated in the accompanying drawings. When in this position the outer end of the bolt or member 15 terminates within the groove or channel 14 so that no hinderance or obstruction is offered by the set bolt or member 15 within the bore of the member M. The head 16 of the set bolt or member 15 is spaced directly below a recess or cut-out portion 17 in the lower part of the valve sleeve 6, the free corner portions of said recess or cut-out portion having direct contact with the head 16, thus providing a means to prevent accidental endwise movement of the bolt or member 15.

The notched or cut-out portion 17 is of a width, however, greater than the reduced portion 15′ of the bolt or member 15 so that upon endwise movement of the bolt or member 15 in a direction inwardly of the valve chamber 4 the valve sleeve 6 will be permitted to move downwardly under the influence of the expansible member or spring 8 a distance sufficient to effectively close the passage of air through the line 1 to the brake cylinder C. While the closing of the flow through the line 1 will be effected automatically, it is to be stated at this time that the sleeve valve 6 together with the bolt or member 15 are adapted to be manually set with the valve in open position.

Snugly engaged within the member M is a piston P of any desired construction and the head 18 of the member M rearwardly of the piston P has discharging therethrough a pipe line 19 leading from the brake cylinder C and through which pipe line 19 is adapted to pass air upon building up of abnormal pressure within the brake cylinder C.

To one side of the pipe line 19, the head 18 of the member M is provided with a discharge vent or opening 20 which is closed by the plug 21 when the piston P is in its normal retracted position. The plug 21 is carried by the piston P so that upon movement of the piston P away from the head 18 a sufficient distance the plug 21 will be entirely withdrawn from within the opening 20 and thereby permit the air pressure within the brake cylinder C to escape out through the pipe line 19 and the opening 20.

The movement of the piston P as effected by the air pressure is resisted by an expansible member or coil spring 22 of desired tension, said spring being interposed between the piston P and the head 23 for the member M remote from the piston P or opposite to the head 18. This spring is of a tension sufficient to hold the piston P against movement during the period or time the pressure within the brake cylinder C is normal but, as is believed to be obvious, should the air pressure within the cylinder C build up as a result of a bad order triple or as a result of the failure of the triple, the increased air pressure will result in the desired movement of the piston P to open the vent 20 to release the air pressure within the cylinder C.

Surrounding the expansible member or spring 22 is a pair of operating and holding members 24. These members are of duplicate construction and, as herein disclosed, are each substantially semi-circular in cross section although they of necessity do not have to be of this particular configuration. These members 24 in relatively close proximity to an end thereof are provided with the outstanding flanges 25. These flanges 25 are disposed circumferentially around the members 24 and are adapted to have close contact with the interior wall of the member M. This contact of the flanges 25 with such wall is maintained by the expansible springs 26 interposed between the members 24 operating to constantly urge said springs 24 one away from the other.

At the time the bolt or member 15 and the valve sleeve 6 are set the members 24 are also set in contact with the piston P when in its fully retracted position and the flanges 25 are so positioned on the members 24 that just after the piston P has moved a distance sufficient to entirely withdraw the plug 21 within the member M, the springs 26 will effect an outward separating movement of the members 24 as the flanges 25 at that time will be in register with the annular groove or channel 14 and be freely received therein. As a result of this outward or separating movement of the members 24 the flange 25 of one of said members will have contact with the end portion of the bolt or member 15 within the groove or channel 14 and force the bolt 15 outwardly a distance sufficient to disengage the head 16 of the bolt or member 15 from the valve sleeve 6 whereupon said valve sleeve 6 under the action of the expansible member or spring 8 will promptly move into closed position. It will, therefore, at once be seen that the abnormal pressure built up within the brake cylinder C not only operates to effect a shutting off of the air feed to the brake cylinder but at the same time operates a means to permit the release of the air pressure within the brake cylinder. It is also believed to be obvious in view of the foregoing that the several operations just referred to occurring under the influence of abnormal air pressure occur independently of any other operations and are automatically effected. The device is manually reset.

To those familiar with brake equipment it is believed to be entirely clear that abnormal building of pressure within a brake cylinder generally occurs as a result of a bad order triple valve or as a result of failure of the triple valve.

From the foregoing description it is thought to be obvious that an air brake equipment constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In an air brake system, a brake cylinder, an air line leading thereto, a valve interposed in said line, means for automatically closing said valve, a movable member for holding said valve in open position, a cylinder in communication with the brake cylinder, said movable member extending within the second cylinder, a piston within the second cylinder and moving in one direction upon abnormal pressure within the brake cylinder, a pair of separable members within the second cylinder and moved therein by the piston as the same is moved under the influence of abnormal air pressure, means for moving said separable members in a direction one away from the other, the inner wall of the second cylinder having an annular groove, the separable members having flanges extending within said annular groove upon predetermined movement of the piston and the separable members, one of the flanges as it enters the groove contacting with the movable member to move the same to release the valve member.

2. In an air brake system, a brake cylinder, an air line leading thereto, a valve interposed in said line, means for automatically closing said valve, a movable member for holding said valve in open position, a cylinder in communication with the brake cylinder, said movable member extending within the second cylinder, a pair of separable members within the second cylinder and movable in one direction within said second cylinder under the influence of abnormal air pressure, means for moving said separable members in a direction one away from the other, said second cylinder being provided with means when said separable members are at a predetermined point of their travel within the second cylinder to have swinging movement sufficient to allow one of said members to contact with the movable member to release the same from the valve member.

LEVI D. EASON.